United States Patent
Mochizuki (10) Patent No.: US 9,743,637 B2
(45) Date of Patent: Aug. 29, 2017

(54) EXCREMENT-TREATING MATERIAL AND METHOD FOR MANUFACTURING SAME

(71) Applicants: PEPARLET CO., LTD., Shizuoka (JP); UNICHARM CORPORATION, Ehime (JP)

(72) Inventor: Shotaro Mochizuki, Shizuoka (JP)

(73) Assignees: PEPARLET CO., LTD., Shizuoka (JP); UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/104,976

(22) PCT Filed: Nov. 18, 2014

(86) PCT No.: PCT/JP2014/080463
§ 371 (c)(1),
(2) Date: Jun. 16, 2016

(87) PCT Pub. No.: WO2015/098361
PCT Pub. Date: Jul. 2, 2015

(65) Prior Publication Data
US 2016/0316713 A1   Nov. 3, 2016

(30) Foreign Application Priority Data
Dec. 26, 2013   (JP) .................. 2013-269280

(51) Int. Cl.
*A01K 1/015*   (2006.01)
*B01J 20/22*   (2006.01)
(Continued)

(52) U.S. Cl.
CPC .......... *A01K 1/0154* (2013.01); *A01K 1/0152* (2013.01); *A01K 1/0155* (2013.01);
(Continued)

(58) Field of Classification Search
CPC ... A01K 1/0155; A01K 1/0154; A01K 1/0152
(Continued)

(56) References Cited

U.S. PATENT DOCUMENTS 6,371,050 B1 * 4/2002 Mochizuki ........... A01K 1/0154
119/172
6,405,678 B2 * 6/2002 Ikegami ............... A01K 1/0155
119/171
(Continued)

FOREIGN PATENT DOCUMENTS

JP   4-335841 A   11/1992
JP   2003-274780 A   9/2003
(Continued)

OTHER PUBLICATIONS

International Search Report in PCT/JP2014/080463, mailed Mar. 10, 2015.

*Primary Examiner* — Yvonne Abbott-Lewis
(74) *Attorney, Agent, or Firm* — Hauptman Ham, LLP (57) ABSTRACT

An excrement-treating material has a core part, and a surface layer bonded to the core part by utilizing the adhesion ability of a water-absorbable polymer in the surface layer without using an adhesive. The excrement-treating material suitably exerts the water absorbability and water transport ability inherent to the surface layer. The excrement-treating material is constituted by incorporating pulverized water-absorbable polymer particles of 20 μm to 50 μm, and adding water to the surface of the core part after granulation to noncontinuously form a highly-wet part; reacting a water content in the highly-wet part and the pulverized water-absorbable polymer to noncontinuously form an adhering part; and bonding the surface layer to the core part through the adhering part. Upon absorption of excreted urine, permeation of the urine into the core part is accelerated in a part other than the adhering part.

8 Claims, 10 Drawing Sheets

(51) Int. Cl.
  *B01J 20/26* (2006.01)
  *B01J 20/28* (2006.01)
  *B01J 20/30* (2006.01)
  *B01J 20/32* (2006.01)

(52) U.S. Cl.
  CPC ............ *B01J 20/22* (2013.01); *B01J 20/261* (2013.01); *B01J 20/264* (2013.01); *B01J 20/28004* (2013.01); *B01J 20/28016* (2013.01); *B01J 20/3014* (2013.01); *B01J 20/3021* (2013.01); *B01J 20/3035* (2013.01); *B01J 20/3208* (2013.01)

(58) Field of Classification Search
  USPC .................................................. 119/171–174
  See application file for complete search history.

(56) References Cited

U.S. PATENT DOCUMENTS

| | | | | |
|---|---|---|---|---|
| 6,619,233 | B1 * | 9/2003 | Mochizuki | A01K 1/0155 119/171 |
| 6,745,720 | B2 * | 6/2004 | Rasner | A01K 1/0152 119/171 |
| 7,066,110 | B2 * | 6/2006 | Mochizuki | A01K 1/0155 119/171 |
| 7,331,309 | B2 * | 2/2008 | Burckbuchler, Jr. | A01K 1/0155 119/171 |
| 7,603,964 | B2 * | 10/2009 | Jenkins | A01K 1/0152 119/171 |
| 8,601,981 | B2 * | 12/2013 | Spittle | A01K 1/0152 119/172 |
| 8,733,288 | B2 * | 5/2014 | Winkleman | A01K 1/0152 119/173 |
| 9,307,742 | B2 * | 4/2016 | Ito | A01K 1/0155 |
| 9,538,722 | B2 * | 1/2017 | Hiroshima | A01K 1/0152 |
| 2009/0308322 | A1 * | 12/2009 | Shimizu | A01K 1/0155 119/171 |

FOREIGN PATENT DOCUMENTS

| JP | 2005-318902 A | 11/2005 |
|---|---|---|
| JP | EP 2979542 A4 * | 11/2016 |

* cited by examiner

EXCREMENT-TREATING MATERIAL AND METHOD FOR MANUFACTURING SAME

RELATED APPLICATIONS

The present application is a National Phase entry of International Application No. PCT/JP2014/080463, filed Nov. 18, 2014, which claims priority of Japanese Application No. 2013-269280, filed Dec. 26, 2013.

TECHNICAL FIELD

The present invention relates to an excrement-treating material formed of a compression-granulated water-absorbing granular body and having a composite layer structure of a core part and a surface layer, and a method for manufacturing the excrement-treating material.

BACKGROUND ART

As shown in the following Patent Literature 1, an excrement-treating material having a composite layer structure of a water-absorbable core part and a water-absorbable surface layer covering the surface of the core part and having enhanced water absorbability has been already known since before. The surface layer in the excrement-treating material of Patent Literature 1 is formed of a powder of a water-absorbing resin such as a water-absorbable polymer, and is formed by reacting the powder of a water-absorbing resin with a water content that is present on the surface of the core part to thereby bond the powder to the surface of the core part.

Furthermore, as shown in the following Patent Literatures 2 and 3, excrement-treating materials that are premised on the above-mentioned composite layer structure, which enable, upon absorption of excreted urine from a cat, a dog or the like, easy discrimination of a used part (a part that has received excreted urine) and a unused part (a part that has not received excreted urine) by the exposure of the color on the core part by permeation or immersion through the surface layer that has got wet, while ensuring a water-absorption ability, are already known. The surface layer in the excrement-treating materials of Patent Literatures 2 and 3 are each formed by using plant fibers as a major material and containing an adhesive such as starch and a water-absorbable polymer, and is formed by bonding to the surface of the core part through a water-soluble adhesive represented by polyvinyl alcohol (PVA).

CITATION LIST

Patent Literature

Patent Literature 1: JP 4-335841 A
Patent Literature 2: JP 2003-274780 A
Patent Literature 3: JP 2005-318902 A

SUMMARY OF INVENTION

Technical Problem

The excrement-treating material of the above-mentioned Patent Literature 1 has an advantage that the water-absorbable polymer constituting the surface layer reacts with the water content on the surface of the core part to exert an adhesion ability by itself, and thus the surface layer can be easily bonded to the surface of the core part, but has a problem that the water-absorbable polymer that has reacted with the water content partially lacks its water absorbability, and thus the water absorbability of the entirety of the surface layer is decreased.

In addition, when the water-absorbable polymer has once reacted with the water content to exert adhesion ability and be gelatinized, this also causes inhibition of the introduction of excreted urine to the core part, and thus it is possible that the function that is inherent to the surface layer to conduce the excreted urine to the core part cannot be exerted.

Furthermore, in the excrement-treating materials of the above-mentioned Patent Literatures 2 and 3, the reaction of the water-absorbable polymer in the surface layer-compounding material can be prevented by bonding the compounding material for the surface layer to the surface of the core part through an adhesive such as PVA, whereas the excrement-treating materials have a problem that the adhesive adheres to a spray apparatus, a drum apparatus or the like for applying the adhesive in the processes of manufacture, and thus frequent operations for maintenance are required.

In addition, since it is necessary to use PVA after heating and then dissolving in water, complex operations are forcedly required.

Solution to Problem

The present invention provides an excrement-treating material that effectively solves the problem possessed by the above-mentioned conventional excrement-treating materials, and utilizes the adhesion ability of the water-absorbable polymer in the surface layer-compounding material without using an adhesive, and suitably exerts the water absorbability and water transport ability that are inherent to the surface layer, and a method for manufacturing the excrement-treating material.

In summary, the excrement-treating material according to the present invention is constituted by incorporating a pulverized water-absorbable polymer that has been pulverized into particle sizes of from 20 μm to 50 μm by means of a pulverizer and plant fibers each having a fiber length of 0.1 mm to 2 mm into a compounding material for the surface layer, and partially adding water to the surface of the core part after granulation to noncontinuously form a highly-wet part; reacting a water content in the highly-wet part and the pulverized water-absorbable polymer in the surface layer-compounding material to noncontinuously form an adhering part; bonding the surface layer to the surface of the core part through the adhering part; and upon absorption of excreted urine, accelerating the permeation of the excreted urine into the core part in a part other than the adhering part between the surface layer and the surface of the core part, and thus simultaneously achieves utilization of the adhesion ability of the water-absorbable polymer and exertion of the functions that are inherent to the surface layer.

Preferably, the core part is colored by a water-insoluble pigment or by the color of a base material of a material that is incorporated in a compounding material for the core part so that the excrement-treating material has a constitution where the color of the core part is seen through the surface layer and the seeing-through is accelerated by the adhering part upon absorption of excreted urine, whereby discrimination between before use and after use is also enabled.

Alternatively, the core part is colored by a water-soluble dye so that the excrement-treating material has a constitution where, upon absorption of excreted urine, the water-soluble dye is eluted into the excreted urine through a part other than the adhering part on the surface of the core part to stain the surface layer, whereby discrimination between before use and after use is also enabled.

Alternatively, a water-soluble dye powder is incorporated in the compounding material for the surface layer so that the excrement-treating material has a constitution where the elution of the water-soluble dye powder into the water content of the highly-wet part on the surface of the core part is prevented by the adhering part, and also has a constitution where, upon absorption of excreted urine, the water-soluble dye powder is eluted into the excreted urine to stain the surface layer, whereby an excrement-treating material that suitably contributes to discrimination between before use and after use is formed.

In addition, a method for manufacturing an excrement-treating material according to the present invention is a method for manufacturing an excrement-treating material including a water-absorbable core part and a water-absorbable surface layer covering the core part, and the method includes the processes of the following A to E:

A: wet-kneading a compounding material for the core part;

B: compression-granulating the wet-kneaded compounding material for the core part;

C: partially adding water to the surface of the granulated core part;

D: sprinkling a compounding material for the surface layer containing a pulverized water-absorbable polymer that has been pulverized into particle sizes of from 20 μm to 50 μm by means of a pulverizer and plant fibers each having a fiber length of 0.1 mm to 2 mm, with the surface of the core part to which water has been added; and E: compression-bonding the surface layer to the surface of the core part.

Preferably, a water-insoluble pigment powder or a water-soluble dye powder or a water-soluble dye solution is incorporated in the compounding material for the core part to thereby manufacture a colored kneaded product, and the kneaded product is compression-granulated to give a colored core part.

Alternatively, the method includes a process of coloring the surface of the core part manufactured in the compression-granulating process with a water-insoluble pigment or a water-soluble dye, whereby a core part with a colored surface is obtained.

Alternatively, a water-soluble dye powder is incorporated in the compounding material for the surface layer, whereby a surface layer that stains itself upon absorption of excreted urine is formed.

ADVANTAGEOUS EFFECTS OF INVENTION

According to the present invention, an adhering part is obtained by instantly reacting the pulverized water-absorbable polymer with the water content in the highly-wet part on the surface of the core part by utilizing the high-speed water-absorbability of the pulverized water-absorbable polymer incorporated in the compounding material for the surface layer of the core part, whereas the reaction of the residual pulverized water-absorbable polymer with the water content in the surface layer-compounding material can be suppressed. Therefore, the adhesion performance of the water-absorbable polymer is utilized, but the water absorbability of the entirety of the surface layer is not decreased.

Furthermore, the water transport ability of the part other than the adhering part on the surface of the core part is ensured by noncontinuously forming the adhering part on the surface of the core part, whereby suitable upon absorption of excreted urine by the composite layer structure of the core part and the surface layer is sought.

BRIEF DESCRIPTION OF DRAWINGS

FIGS. 10A and 10B are explanatory drawings that schematically show a surface layer compression bonding process, wherein

DESCRIPTION OF EMBODIMENTS

The best mode of the present invention will be explained below based on FIGS. 1 to 10B.

Example 1

As shown in FIGS. 1 to 4, the excrement-treating material according to the present example is premised on an excrement-treating material having a composite layer structure formed of a water-absorbable core part 1 and a water-absorbable surface layer 2 covering the core part 1. The structure of the excrement-treating material according to the present invention will be explained in detail based on each of FIGS. 1 to 4.

Figure 1:
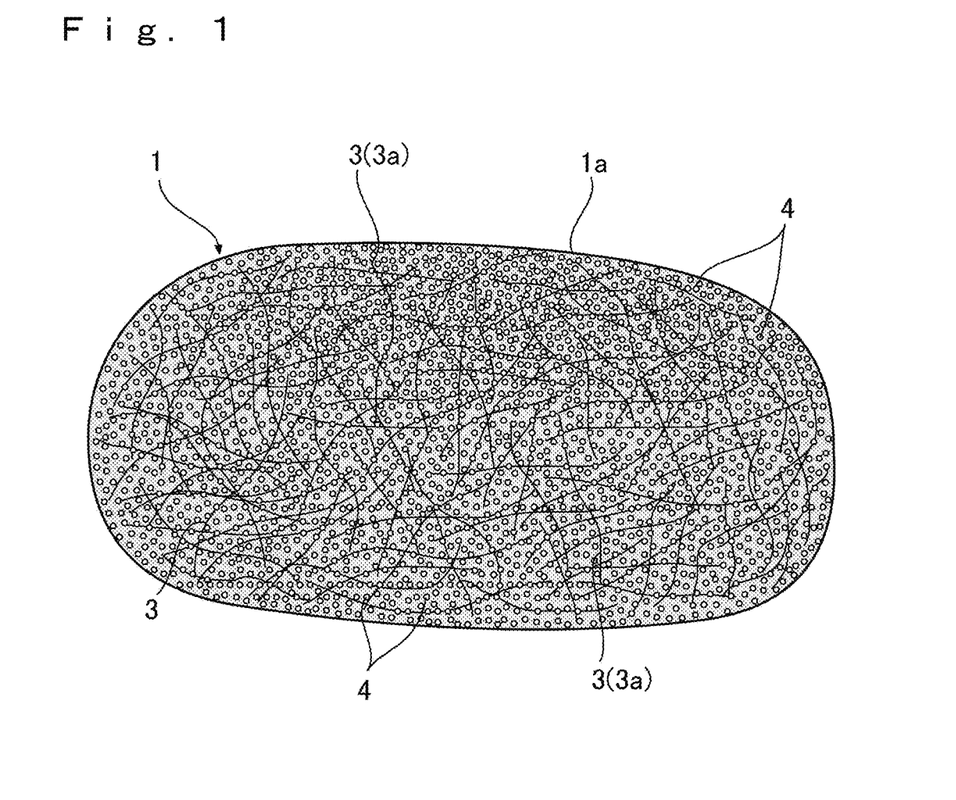
FIG. 1 is a cross-sectional drawing of a core part of an excrement-treating material according to the present invention.

The core part 1 shown in FIG. 1 has been granulated into sizes of particle sizes from 1 mm to 20 mm, and is obtained by wet-kneading and compressing a compounding material containing plant fibers (virgin pulp from wood materials, pulp recycled from waste paper, bamboo pulp, used tea leaves, soy pulp and the like) 3 and a water-absorbable polymer 4 such as polyacrylic acid-based polymers and starch-acrylic acid-based polymers as major materials. The above-mentioned plant fibers 3 and the water-absorbable polymer 4 can be obtained by pulverizing waste materials from disposable diapers, sanitary products and the like. In this case, materials such as paper pieces are also incorporated, and these are also formed of plant fibers, and thus are also explained as plant fibers in the present application.

The plant fibers 3 (3a) that are incorporated in the core part 1 each has a fiber length of from 1 mm to 8 mm. Furthermore, as the above-mentioned water-absorbable polymer 4, a water-absorbable polymer having a particle size of approximately 400 μm is used, unlike the pulverized water-absorbable polymer mentioned below.

Furthermore, inorganic filler materials such as calcium carbonate, clay, talc and bentonite may be incorporated in the compounding material for the core part 1 to add a suitable weight, to thereby prevent scattering during laying and use of the excrement-treating material.

Furthermore, adhesives such as starches (corn starch, tapioca starch, potato starch and the like) or/and carboxylmethyl cellulose (CMC) are suitably selected and incorporated together with the above-mentioned inorganic filler materials in the compounding material for the core part 1, in an optional manner depending on working.

In addition, flavor materials, antibacterium agents and the like are incorporated in the compounding material for the core part 1 in an optional manner depending on working.

The excrement-treating material according to the present invention is such that the surface 1a of the core part 1 is covered with the surface layer 2 mentioned below to give a composite layer structure formed of the core part 1 and the surface layer 2. Secondly, the structure in which the surface 1a of the core part is covered with the surface layer 2 will be explained.

As the compounding material for the surface layer 2 covering the surface 1a of the core part, plant fibers 3 (3b) are incorporated together with the pulverized water-absorbable polymer 7 that has been pulverized the water-absorbable polymer 4 into particle sizes of from 20 μm to 50 μm the above-mentioned in the compounding material for the core part 1 in a similar manner to that for the core part 1, and an adhesive such as a starch or CMC is incorporated as necessary, and these are set as the major materials. The plant fibers 3 (3b) that are incorporated in the compounding material for the surface layer 2 each has a fiber length of from 0.1 mm to 2 mm.

Figure 6:
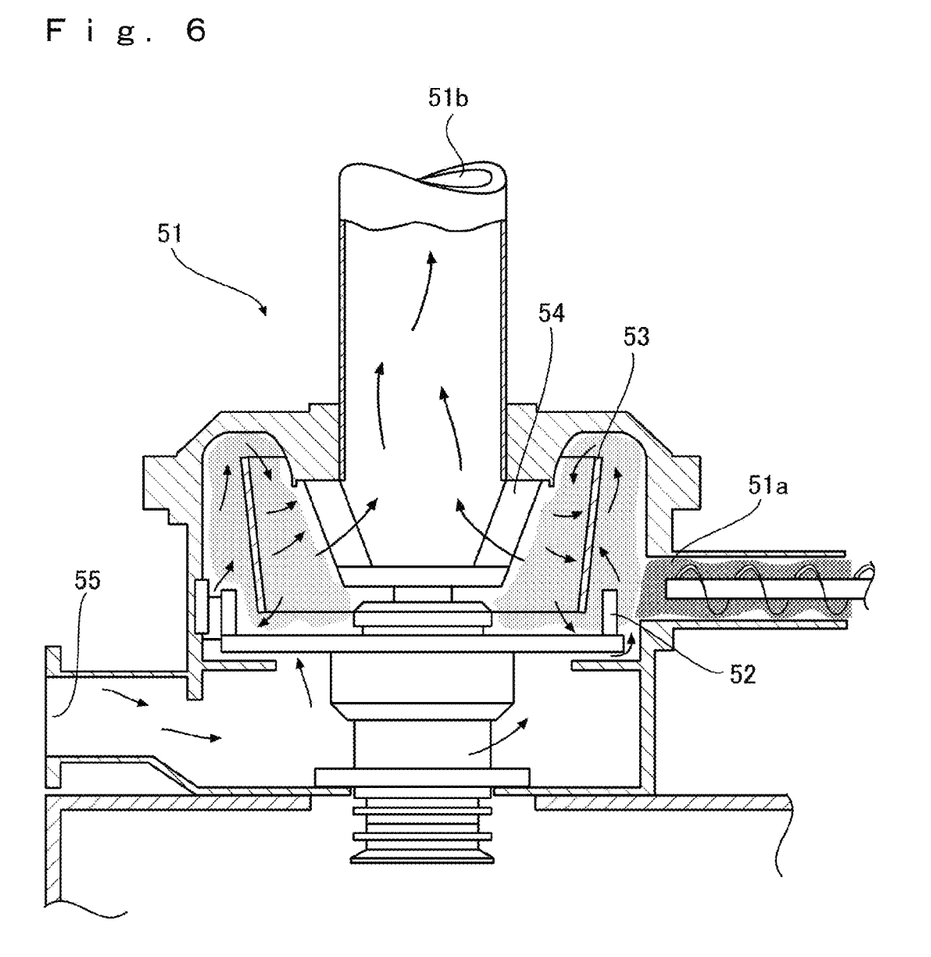
FIG. 6 is an explanatory drawing that schematically shows processes for the generation of the pulverized water-absorbable polymer.

The pulverized water-absorbable polymer 7 is a water-absorbable polymer that has been pulverized by means of a dry-type, collision-type pulverizer, and for example, as shown in FIG. 6, it is a water-absorbable polymer that has been pulverized by means of a known pulverizer 51.

A water-absorbable polymer as a raw material is sent from a supply port 51a of the pulverizer 51, and the water-absorbable polymer that has been sent comes into collision with a pulverizing rotor 52 that is rotating, and the water-absorbable polymers come into collision and are pulverized into particle sizes of from 20 μm to 50 μm. The coarse water-absorbable polymer that has not reach desired particle sizes is repelled by a classification rotor 54 that is rotating, descends along the inner circumferential surface of a guide ring 53, and comes into collision with the pulverizing rotor 52 again. Furthermore, the water-absorbable polymer that has been pulverized into desired particle sizes is conveyed by a circulating airflow that flows from an air admission port 55 to an outlet 51b, and ejected from the outlet 51b through the inner side of the classification rotor 54. The pulverized water-absorbable polymer 7 having a particle size of from 20 μm to 50 μm is obtained by adjusting the rotation velocity of the classification rotor 54 and the air volume of the circulating airflow.

Wide varieties of planes are formed on the surface of the pulverized water-absorbable polymer 7 by the pulverization, and thus the rate of the surface area per volume has been increased from before the pulverization. Therefore, the water-absorbable polymer can quickly react with the water content to absorb the water content. Furthermore, since the water-absorbable polymer has small particle sizes and thus is light, the water-absorbable polymer is easily sprinkled in the plant fibers 3 (3b) in the surface layer-compounding material. In addition, the pulverized water-absorbable polymer 7 in the present invention is not limited to the water-absorbable polymer that has been pulverized by the collision type pulverizer exemplified in FIG. 6, and can also be pulverized by using a known pulverizer such as a pulverizer utilizing a high-speed fluid or a pulverizer utilizing a high-speed vortex flow and a high-frequency wave pressure oscillation.

Figure 2:
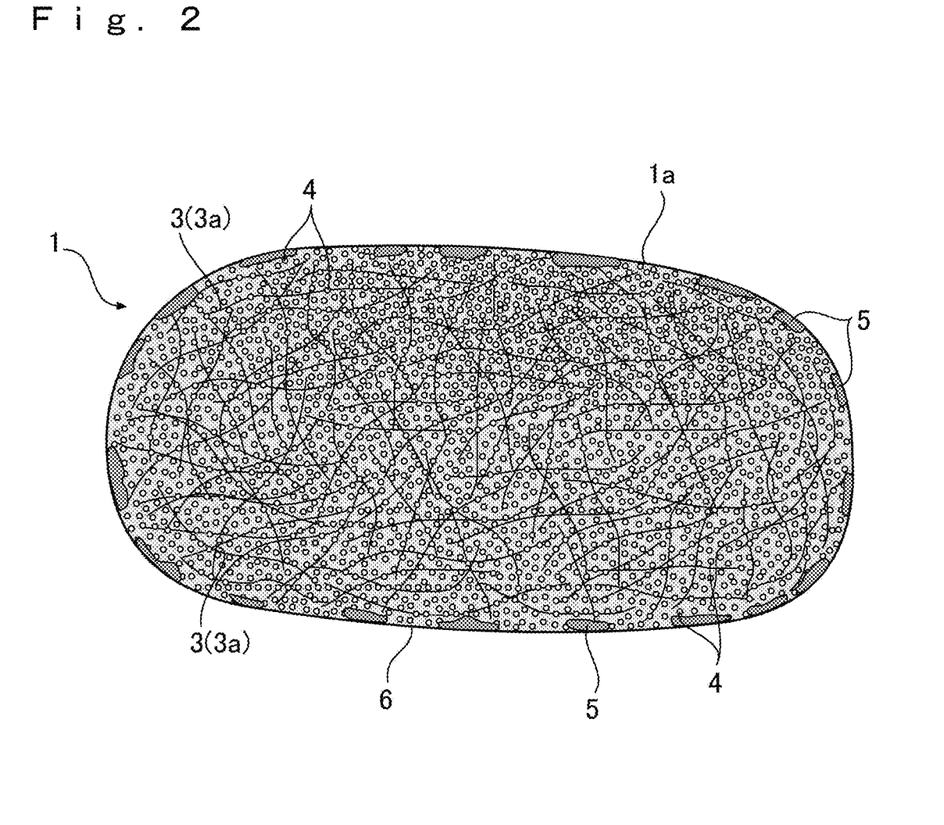
FIG. 2 is a cross-sectional drawing showing the state in which a highly-wet part has been noncontinuously formed by partially adding water to a surface of the core part.

As shown in FIG. 2, in the excrement-treating material according to the present invention, water is partially added to the surface 1a of the core part 1 immediately after granulation to noncontinuously form a highly-wet part 5, and the water content in the highly-wet part 5 and the pulverized water-absorbable polymer 7 in the surface layer-compounding material mentioned below are reacted to form an adhering part 8 shown in FIGS. 3 and 4, and the surface layer 2 is bonded. Specifically, the highly-wet part 5 and a lowly-wet part 6 are randomly formed on the surface 1a of the core part, and the water content in the highly-wet part 5 and the pulverized water-absorbable polymer 7 in the surface layer-compounding material are positively reacted to give the adhering part 8, whereby the surface layer 2 is bonded.

In detail, as shown in FIG. 2, the highly-wet part 5 is noncontinuously formed on the surface 1a of the core part, and simultaneously, the residual surface 1a of the core part is set as the lowly-wet part 6, and the compounding material for the surface layer 2 is sprinkled on the surface 1a of the core part on which the highly-wet part 5 and the lowly-wet part 6 have been formed.

Figure 3:
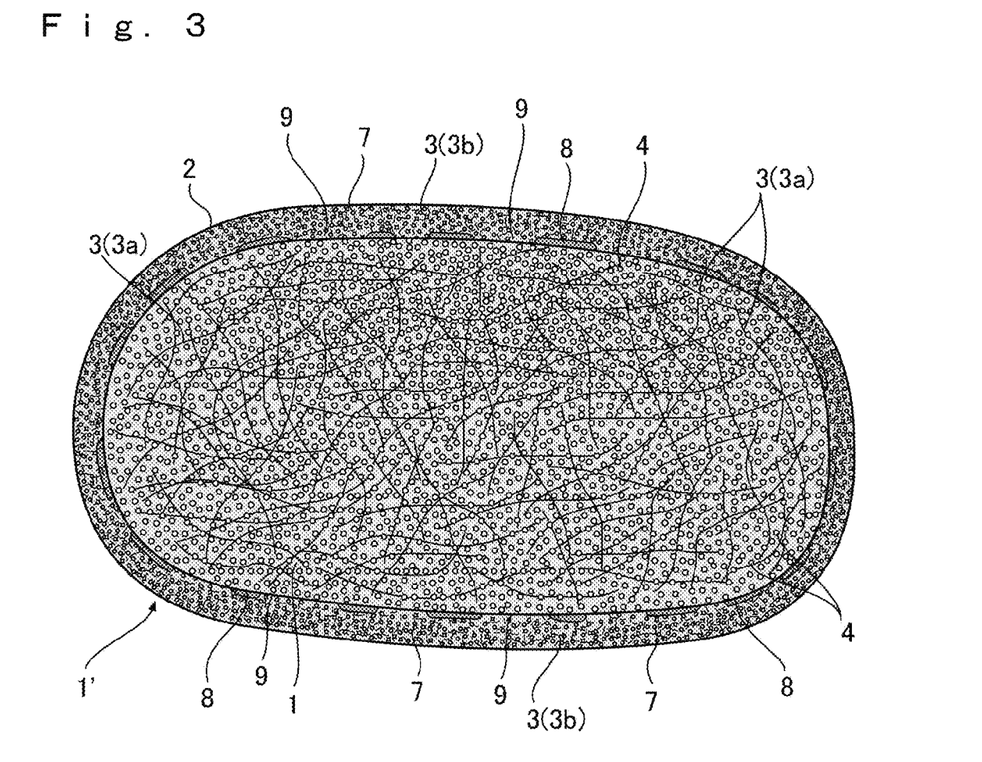
FIG. 3 is a cross-sectional drawing showing the state in which a surface layer has been formed on the surface of the core part.
Figure 4:
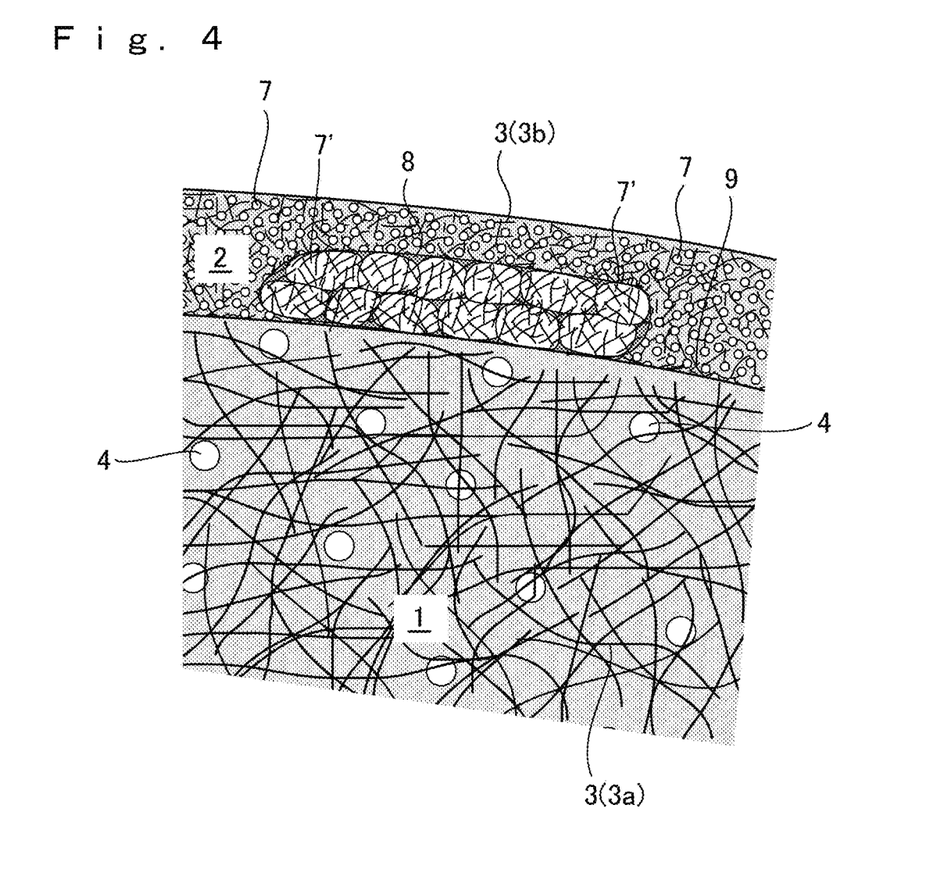
FIG. 4 is an explanatory drawing that schematically shows the state in which the adhering part has been formed by the reaction of a pulverized water-absorbable polymer with a water content.

At this time, as shown in FIGS. 3 and 4, the pulverized water-absorbable polymer 7 having a particle size of from 20 μm to 50 μm incorporated in the compounding material for the surface layer 2 quickly reacts with the water content in the highly-wet part 5 (absorbs the water content) and adheres, with swelling, to the adjacent pulverized water-absorbable polymer 7 by its own adhesion ability to thereby form the adhering part 8 that is transparent and has a plate-like shape. In addition, 7' in FIG. 4 shows the pulverized water-absorbable polymer 7 that has swollen, and 9 in FIGS. 3 and 4 shows a part other than the adhering part 8 on the surface 1a of the core part, that is, a part on which the adhering part has not been formed, and the part 9 on which the adhering part has not been formed is formed between the adhering parts 8 that are rising in transparent, plate-like shapes.

Furthermore, the compounding material for the surface layer 2 is bonded to the surface 1a of the core part through the adhering part 8 to form the surface layer 2, whereby the excrement-treating material according to the present invention 1' is obtained. In addition, the dense surface layer 2 as shown in FIGS. 3 and 4 is formed by the surface layer compression bonding process mentioned below.

As mentioned above, the pulverized water-absorbable polymer 7 in the surface layer-compounding material which has been firstly brought into contact with the water content in the highly-wet part 5 positively absorbs the water content to exert the adhesion ability to thereby prevent the residual pulverized water-absorbable polymer 7 in the compounding material from reacting with the water content. Furthermore, the pulverized water-absorbable polymer 7 that reacts with the water content in the highly-wet part 5 also absorbs the water content in the lowly-wet part 6 around the highly-wet part 5 to thereby prevent the pulverized water-absorbable polymer 7 that is in contact with the lowly-wet part 6 from reacting with the water content.

The excrement-treating material 1' of the present example having the above-mentioned structure has a constitution where, upon absorption of excreted urine, accelerates the permeation of the excreted urine into the core part at the part 9 other than the surface layer 2 and the adhering part 8 on the surface 1a of the core part, to thereby seek to attain both utilization of the adhesion ability possessed by the water-absorbable polymer and exertion of the functions that are inherent to the surface layer 2 (a water-absorbing function and a water transport function).

Figure 5:
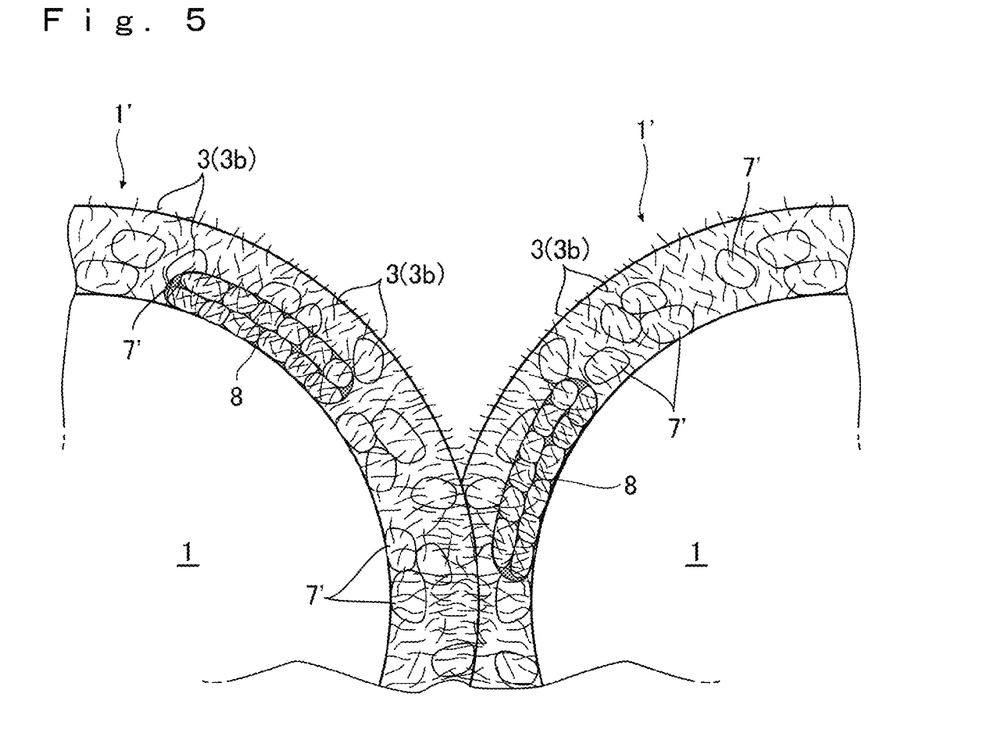
FIG. 5 is an explanatory drawing that schematically shows, with enlargement, the state in which two excrement-treating materials according to the present invention are bonded to each other.

Furthermore, in the excrement-treating material 1' of the present example, as mentioned above, the pulverized water-absorbable polymer 7, which has a small particle size and is light, is scattered among many plant fibers 3b, and as shown in FIG. 5, when the excrement-treating material 1' receives excreted urine, the pulverized water-absorbable polymer 7 in the surface layer 2 absorbs the excreted urine to become the swollen pulverized water-absorbable polymer 7' to thereby exerts an adhesion ability, and simultaneously, the plant fibers 3b in the surface layer 2 transfer in the excreted urine or are pushed out by the swelling of the pulverized water-absorbable polymer 7, and fluff.

Furthermore, the adjacent excrement-treating materials 1' are bonded to each other by the adhesion ability of the swollen pulverized water-absorbable polymer 7' and the entanglement of the plant fibers 3b that transfer or fluff. By this way, many excrement-treating materials 1' are consolidated in clumps, and thus a user can easily take out these masses of the excrement-treating material 1' that has been consolidated in clumps.

Specifically, in the bonding of the excrement-treating materials 1' to each other, the bonding of the excrement-treating materials 1' is complemented by the entangled structure of the above-mentioned plant fibers 3b. Furthermore, it is needless to say that the adhesive such as a starch in the surface layer 2 also contributes to the bonding of the excrement-treating materials 1' to each other.

Example 2

As shown in FIGS. 1 to 4, the excrement-treating material 1' according to the present example is premised on an excrement-treating material having a composite layer structure formed of a water-absorbable core part 1 and a surface layer 2 in a similar manner to that in Example 1, and has a constitution in which a highly-wet part 5 and a lowly-wet part 6 are formed on a surface 1a of a core part 1, the water content in the highly-wet part 5 and a pulverized water-absorbable polymer 7 in a compounding material for the surface layer 2 are reacted to form an adhering part 8, and the surface layer 2 is bonded to the surface 1a of the core part through the adhering part 8, to thereby seek the achievement of both utilization of the adhesion ability possessed by the water-absorbable polymer and exertion of the functions that are inherent to the surface layer 2 (a water-absorbing function and a water transport function). Furthermore, as shown in FIG. 5, similarly to Example 1, the excrement-treating material 1' of the present example is such that the excrement-treating materials 1' are effectively bonded to each other upon absorption of excreted urine by the pulverized water-absorbable polymer 7 that is scattered in the surface layer 2 (in FIG. 5, the swollen pulverized water-absorbable polymer 7') and plant fibers 3b.

The difference of this example from Example 1 is that this example has a constitution where the surface 1a or the entirety of the core part 1 is colored, and upon absorption of excreted urine, the color of the colored core part 1 is exposed by permeation or immersion through the surface layer 2 that has got wet. By this way, before use and after use are easily discriminated.

Subsequently, an example in which the core part 1 is colored will be explained.

Coloring Example 1

In the case of the present example, the surface 1a or the entirety of the core part 1 is colored by using a color material formed of a water-insoluble pigment.

Specifically, the surface 1a of the core part is colored by spraying a dispersion liquid of a water-insoluble pigment onto the surface 1a of the granulated core part 1. Alternatively, a water-insoluble pigment powder is incorporated in the compounding material for the core part 1, the compounding material to which the water-insoluble pigment powder has been incorporated is wet-kneaded and then compression-granulated, whereby the core part 1 in which the entirety including the surface 1a has been colored is obtained.

Coloring Example 2

In the case of this example, the surface 1a or the entirety of the core part 1 is colored by using a color material formed of a water-soluble dye.

Specifically, the solution of the water-soluble dye is sprayed onto the surface 1a of the granulated core part 1 to thereby color the surface 1a of the core part. A powder body or solution of the water-soluble dye is incorporated into the water-soluble dye for the core part 1, the compounding material into which the powder body or solution of the water-soluble dye has been incorporated is wet-kneaded and then compression-granulated, whereby the core part 1 in which the entirety including the surface 1a has been colored is obtained.

Coloring Example 3

In the case of the present example, as the plant fibers 3 in the compounding material for the core part 1, for example, a colored material such as waste paper pulp (pulp having a low degree of whiteness), a coffee extract residue or used tea leaves is incorporated, and the compounding material is wet-kneaded and then compression-granulated, whereby the core part 1 in which the entirety including the surface 1a has been colored with the base material color of these material is obtained.

In each of the above-mentioned Coloring Examples, although the color used for the coloring is not specifically limited, the color is set to be darker than the color of the surface layer 2 so as to be exposed through the surface layer 2 that has got wet. For example, in the case when the color of the surface layer 2 is white, the color used for the coloring can be blue, green, yellow, red, brown, bark or the like.

In addition, it is preferable that the plant fibers 3b as the compounding material for the surface layer 2 are prepared from pulp having a high degree of whiteness. This is because the color is set brighter than the color of the colored part of the surface 1a of the core part to thereby surely expose the color of the core part 1 through the surface layer 2 upon absorption of excreted urine.

In the case when the core part 1 is colored by the color of a water-insoluble pigment or a base material as in Coloring Example 1 or Coloring Example 3 mentioned above, the excrement-treating material 1' of the present example having the above-mentioned structure allows to see of the color of the core part 1 through the surface layer 2 upon absorption of excreted urine, and accelerates the see-through by the transparent, plate-like adhering part 8. That is, the color of the surface 1a or the entirety of the colored core part 1 is exposed by permeation through the surface layer 2, and the exposure by permeation is complemented by the adhering part 8.

Furthermore, in the case when the core part 1 is colored by the water-soluble dye as in the above-mentioned Coloring Example 2, upon absorption of excreted urine, the water-soluble dye is eluted into the excreted urine through the part 9 other than the adhering part on the surface 1a of the core part to color the surface layer 2. That is, the color of the surface 1a or the entirety of the colored core part 1 is exposed by penetration through the surface layer 2 and the part 9 on which the adhering part has not been formed.

Example 3

As shown in FIGS. 1 to 4, the excrement-treating material 1' according to the present example is also premised on a composite layer structure formed of a water-absorbable core part 1 and a water-absorbable surface layer 2 in a similar manner to that in Examples 1 and 2, and has a constitution in which a highly-wet part 5 and a lowly-wet part 6 are formed on a surface 1a of a core part 1, the water content in the highly-wet part 5 and a pulverized water-absorbable polymer 7 in a compounding material for the surface layer 2 are reacted to form an adhering part 8, and the surface layer 2 is bonded to the surface 1a of the core part through the adhering part 8, to thereby seek the achievement of both utilization of the adhesion ability possessed by the water-absorbable polymer and exertion of the functions that are inherent to the surface layer 2 (a water-absorbing function and a water transport function). Furthermore, as shown in FIG. 5, similarly to Examples 1 and 2 mentioned above, the excrement-treating material 1' of the present example is such that the excrement-treating materials 1' are effectively bonded to each other upon absorption of excreted urine by the pulverized water-absorbable polymer 7 that is scattered in the surface layer 2 (in FIG. 5, the swollen pulverized water-absorbable polymer 7') and the plant fibers 3.

The difference of this example from Examples 1 and 2 mentioned above is that a water-soluble dye powder is incorporated in the compounding material for the surface layer 2 gives a constitution where the elution of the water-soluble dye powder into the water content in the highly-wet part 5 on the surface 1a of the core part 1 is prevented by the adhering part 8, and also gives a constitution where, upon absorption of excreted urine, the water-soluble dye powder is eluted into the excreted urine to stain the surface layer 2. By this way, before use and after use are easily discriminated.

In addition, although the color of the water-soluble dye powder is not specifically limited, in order to clarify the change from the color of the surface layer 2 before absorption of urine, i.e., the color of the plant fibers 3b contained in the compounding material of the surface layer 2 and the color of the pulverized water-absorbable polymer 7, the color is set to be darker than the colors of these plant fibers 3b and pulverized water-absorbable polymer 7. For example, in the case when the plant fibers 3b are formed by a material having a high degree of whiteness, the color of the pulverized water-absorbable polymer 7 is white, and the color of the surface layer 2 is white, the color used for the coloring can be blue, green, yellow, red or the like.

In the excrement-treating material 1' of the present example having the above-mentioned structure, the water-soluble dye powder in the compounding material for the surface layer 2 stains the surface layer 2 upon absorption of excreted urine, and before use and after use can be properly discriminated by the change in color by the staining.

Subsequently, the method for manufacturing an excrement-treating material according to the present invention will be explained in detail.

Figure 7:
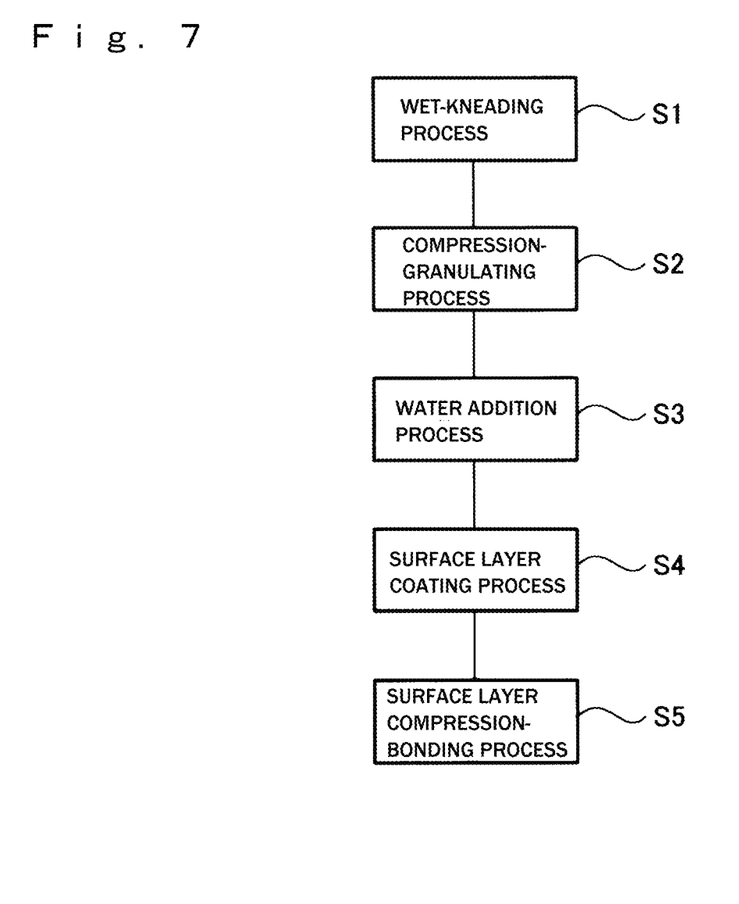
FIG. 7 is a flow chart that schematically shows processes for manufacturing the excrement-treating material.

As shown in FIG. 7, the method for manufacturing an excrement-treating material according to the present invention includes a process of wet-kneading a compounding material for the core element 1 (a wet-kneading process S1); a process of compressing and granulating the wet-kneaded compounding material for the core part 1 (a compression-granulating process S2); discontinuously adding water to the surface 1a of the granulated core part 1 to form a highly-wet part 5 and a lowly-wet part 6 (a water addition process S3); a process of reacting the water content in the highly-wet part 5 and the pulverized water-absorbable polymer 7 in the compounding material for the surface layer 2 to form an adhering part 8, and coating the surface 1a of the core part with the surface layer 2 through the adhering part 8 (a surface layer coating process S4); and a process of compression bonding the surface layer 2 to the surface 1a of the core part (a surface layer compression bonding process S5).

<Wet-Kneading Process>

Firstly, in the wet-kneading process, the compounding material for the core part 1 is kneaded while the water content is adjusted by adjusting the amount of the water to be added and the amount of the injection of the compounding material. By this wet-kneading, the wet kneaded product 11 mentioned below is obtained. A preferable amount of the water to be added is such an amount that the water content rate of the compounding material for the core part 1 can be adjusted to from 15 to 30% by weight.

Furthermore, in the case when the entirety of the core part 1 is colored in the above-mentioned Example 2 in which the core part 1 is colored, a powder of a water-insoluble pigment or a water-soluble dye, or a solution of a water-soluble dye is incorporated in the compounding material for the core part 1 in this process. Alternatively, a kneaded product colored with the color of a base material of a colored material such as waste paper pulp, a coffee extract residue or used tea leaves is formed, and granulated as mentioned below.

<Compression-Granulating Process>

Figure 8:
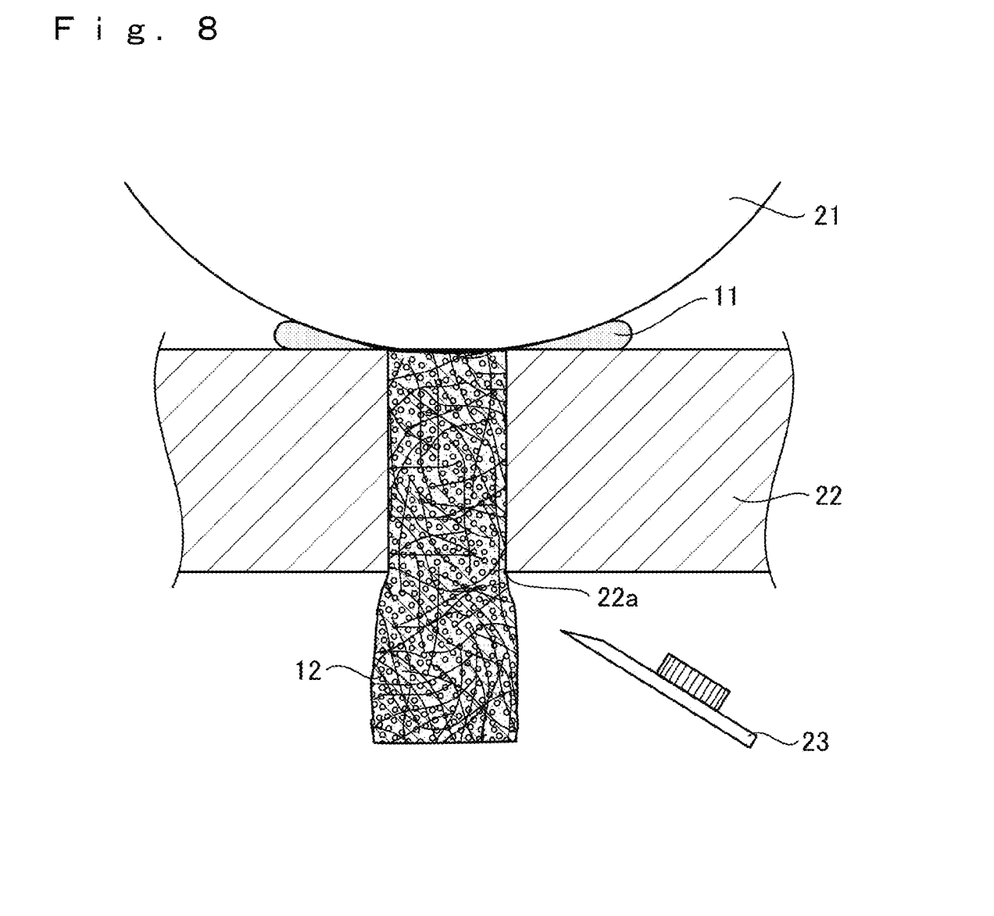
FIG. 8 is an explanatory drawing that schematically shows a compression-granulating process.

Then, as shown in FIG. 8, the kneaded product 11 of the compounding material for the core part 1 which has undergone the wet-kneading process is compression-granulated in a known extrusion type compression granulator to thereby give a granulated product 12.

Specifically, the kneaded product 11 is press-fit into a granulation hole 22a that has been formed in a die 22, by means of a pressurization roller 21, to thereby give the granulated product 12. The above-mentioned granulated product 12 is then swollen by the release of the compression at the outer end of the granulation hole 22a, and broken by a breaking blade 23 to give the core part 1.

In this process, the kneaded product 11 having a water content rate of from 15 to 30% by weight is compression-granulated to give the core part 1 formed of the wet granulated product 12.

<Water Addition Process>

Figure 9:
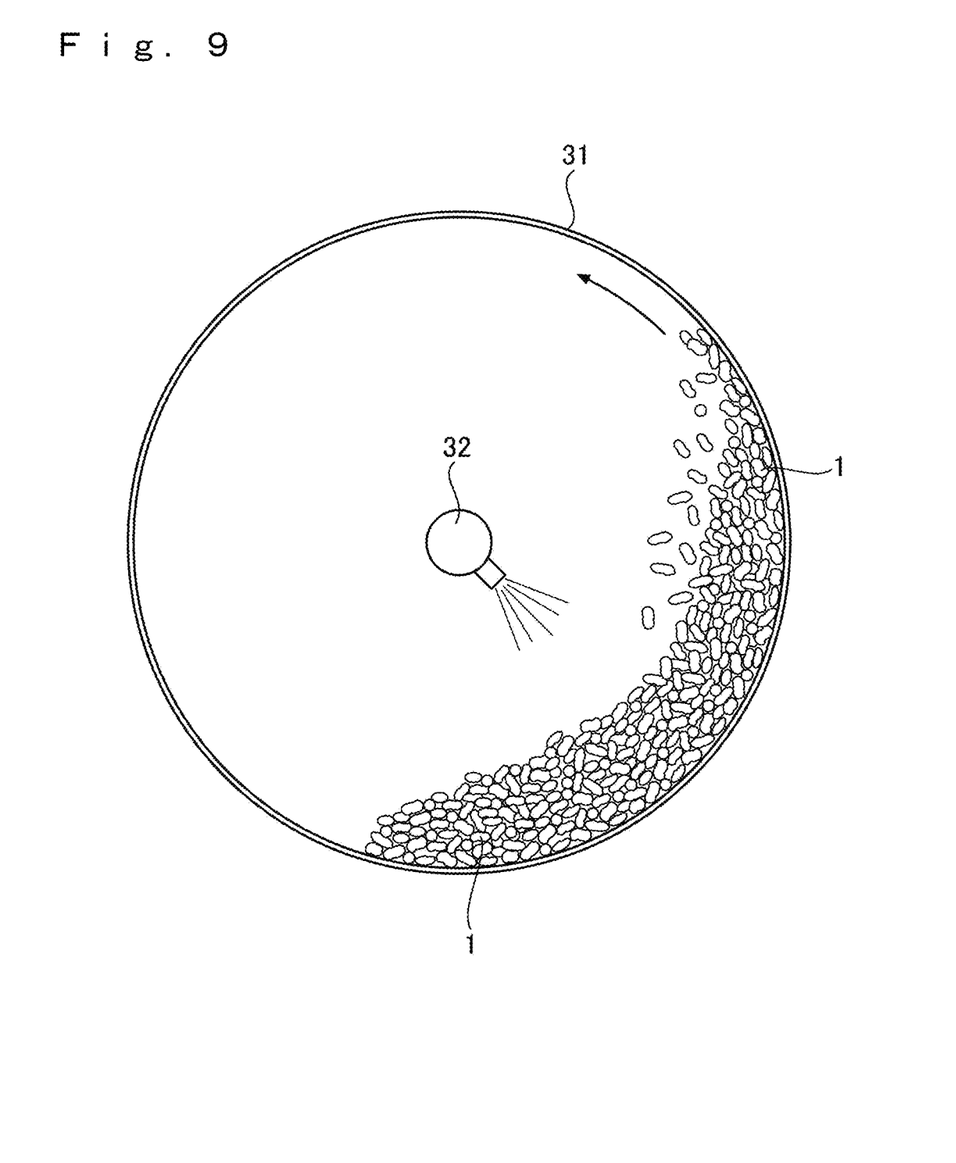
FIG. 9 is explanatory drawing that schematically shows a water addition process.

Then, as shown in FIG. 9, the core part 1 is injected into a known shower drum 31, and water is sprayed onto the core part 1 by means of a shower 32.

At this time, by spraying a suitable amount of water onto the core part 1, the water content adheres to the surface 1$a$ of the core part 1 in a patchy fashion, and the highly-wet part 5 and the lowly-wet part 6 are formed as shown in FIG. 2. The suitable rate of the amount of the water to be sprayed is such that the sprayed water is from 40 ml to 80 ml with respect to 0.3 kg to 0.5 kg of the core part 1 (the core part 1 with a volume of about 1 L). In accordance with the increase or decrease of the core part 1 to be treated in this process, the amount is adjusted within the above-mentioned rate.

Furthermore, in the case when the surface 1$a$ of the core part 1 is colored in the above-mentioned Example 2 in which the core part 1 is colored, a dispersion liquid of a water-insoluble pigment or an aqueous solution of a water-soluble dye is sprayed, and the portion onto which the dispersion liquid or aqueous solution has been sprayed is set as the highly-wet part 5.

Alternatively, the entirety of the surface 1$a$ of the core part 1 is continuously colored with a water-insoluble pigment or a water-soluble dye in a shower drum that is different from the shower drum 31 used in this process, the water content of the colored surface 1$a$ of the core part 1 is adjusted, and water is added by means of the shower drum 31 in this process.

<Surface Layer Coating Process>

Then, the core part 1 in which the highly-wet part 5 has been discontinuously formed on the surface 1$a$ as mentioned above, i.e, the core part 1 in which the highly-wet part 5 and the lowly-wet part 6 have been formed on the surface 1$a$, is injected together with the compounding material for the surface layer 2 into a known coating drum, and the surface 1$a$ of the said core part 1 is coated with the surface layer 2.

At this time, the water content in the highly-wet part 5 on the surface 1$a$ of the core part and the pulverized water-absorbable polymer 7 in the compounding material for the surface layer 2 quickly react, whereby the pulverized water-absorbable polymer 7 swells and exerts an adhesion performance, and the adjacent swollen pulverized water-absorbable polymers 7' bond to each other to form a plate-like shape to thereby form an adhering part 8 as shown in FIG. 3, and the compounding material for the surface layer 2 is bonded through the adhering part 8 to thereby form the surface layer 2.

As mentioned above, the pulverized water-absorbable polymer 7 in the surface layer-compounding material which has firstly contacted the water content in the highly-wet part 5 positively absorbs the water content to exert an adhesion ability, to thereby prevent the residual pulverized water-absorbable polymer 7 in the compounding material from reacting with the water content. Furthermore, the pulverized water-absorbable polymer 7 that reacts with the water content in the above-mentioned highly-wet part 5 also absorbs the water content in the surrounding lowly-wet part 6 to thereby prevent the pulverized water-absorbable polymer 7 that is in contact with the lowly-wet part 6 from reacting with the water content.

Furthermore, in the case when a water-soluble dye powder is incorporated in the compounding material for the surface layer 2 as shown in the above-mentioned Example 3, the adhering part 8 prevents the elution of the water-soluble dye powder into the water content in the highly-wet part 5 on the surface 1$a$ of the core part in this process.

<Surface Layer Compression Bonding Process>

Subsequently, the surface layer 2 that is coating the core part 1 is compression-bonded. Specifically, as shown in FIGS. 10A and 10B, the core part 1 (excrement-treating materials 1') coated with the surface layer 2 is injected into a compression bonding apparatus 41 that finely oscillates up and down, and is transferred with providing repetitive oscillation up and down.

Figure 10A:
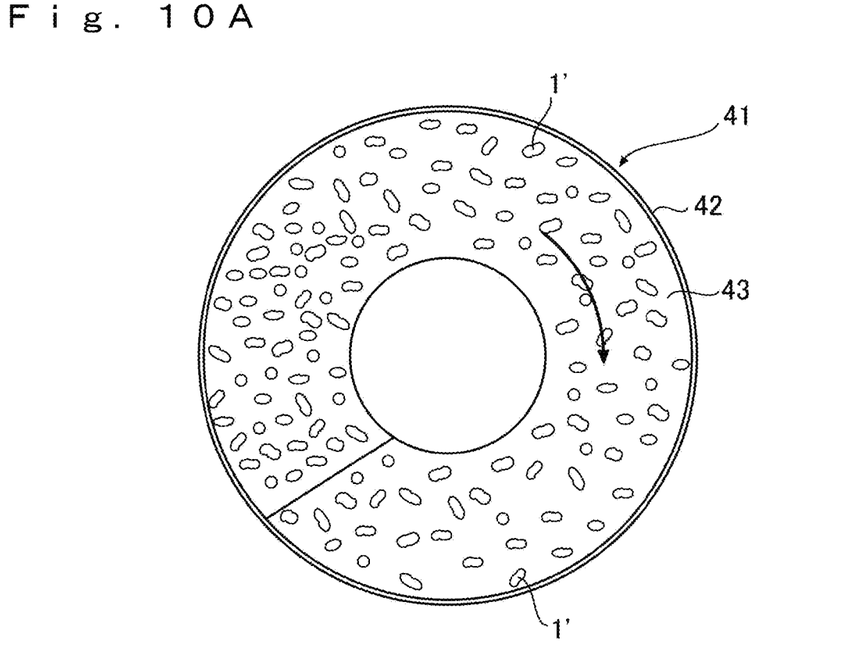
FIG. 10A is a plane view of a compression bonding apparatus.
Figure 10B:
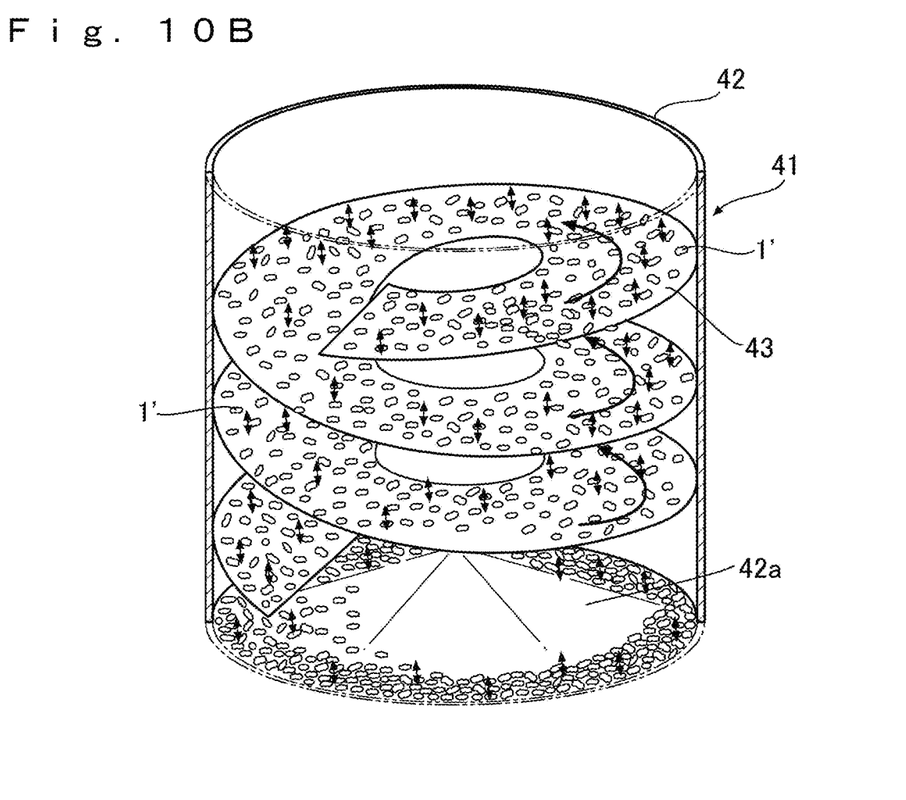
FIG. 10B is a perspective view that schematically shows the internal structure of the compression bonding apparatus with partial cutaway.

As shown in FIGS. 10A and 10B, as the compression bonding apparatus 41, for example, an apparatus having a bottomed-cylindrical oscillating body 42 and a helical path 43 that follows the inner circumferential surface of the oscillating body 42 can be used.

By the oscillations in the vertical and horizontal directions provided to the oscillating body 42, the helical path 43 in the oscillating body 42 is also oscillated. As shown in FIGS. 10A and 10B, the core part 1 (the excrement-treating material 1') coated with the surface layer 2, which has been injected into the upper end of the helical path 43, gradually transfers in the downward direction while the core part 1 oscillates up and down by the above-mentioned oscillation in the vertical and horizontal directions, and finally transfers in the horizontal direction while the core part 1 further oscillates up and down on a bottom plate 42$a$ of the oscillating body 42. Furthermore, as shown in FIGS. 10A and 10B, for example, if the above-mentioned bottom plate 42$a$ is formed into a low-height conical form, then the core part 1 (the excrement-treating material 1') that is present on the bottom plate 42$a$ can be collected along the inner circumferential surface of the oscillating body 42. Therefore, if the core part 1 is oscillated while the core part 1 is collected along the inner circumferential surface of the oscillating body 42 by this way, then the core part 1 is homogeneously mixed at an internal corner formed by the inner circumferential surface and the bottom plate 42$a$ irrespective of the sizes and weights. Furthermore, for example, it is also possible to transfer the core part 1 along the inner circumferential surface (internal corner) of the oscillating body 42 also on the helical path 43 by the width, direction, timing and the like of the oscillation provided to the oscillating body 42.

As mentioned above, by transferring the core part 1 (the excrement-treating material 1') coated with the surface layer 2 by while oscillating the core part 1 up and down, the surface of the surface layer 2 is evenly hit on the helical path 43 or the bottom plate 42$a$, whereby the surface layer 2 is compression-bonded to the surface 1$a$ of the core part.

In addition, as another example of the compression bonding apparatus 41 explained above, it is an optional format depending on operation to dispose a cyclic plate with cutaway part(s) of a single stage of multiple stages instead of the helical path 43, and to allow the core part 1 to sequentially fall through the cutaway part(s) while applying oscillation on the cyclic plate, to finally provide oscillation on the bottom plate 42$a$. Alternatively, the compression bonding of the surface layers may also be by using, for example, a conveyor having an oscillation-generating part.

By this surface layer compression bonding process, as shown in FIGS. 3 and 4, the compounding material for the surface layer 2 enters into a part 9 other than the adhering part 8, on which an adhering part has not been formed, and forms the surface layer 2 that suitably covers the core part 1, whereby the excrement-treating material 1' having a composite layer structure can be manufactured. Specifically, the adhering part 8 that is slightly rising, and the compounding material for the surface layer 2 which has entered into the part 9 on which an adhering part has not been formed and which is dished more than the adhering part 8 is, play a role of an anchor that prevents the peeling-off of the surface layer 2, and when the adhering part 8 and the compounding material receive excreted urine, they function to transport water to thereby guide the excreted urine into the core part 1.

As explained above, the excrement-treating material 1' according to the present invention adopts a composite layer structure obtained by bonding the water-absorbing surface layer 2 and the water-absorbable core part 1 through the adhering part 8 that is noncontinuously and numerously formed on the surface 1a of the core part 1 by the reaction of the water content and the pulverized water-absorbable polymer 7, and has a constitution where, upon absorption of excreted urine, the permeation of the excreted urine into the core part 1 in the part 9 other than the adhering part 8 between the surface layer 2 and the surface 1a of the core part is accelerated, to thereby seek to attain both utilization of the adhesion ability possessed by the water-absorbable polymer and exertion of the functions that are inherent to the surface layer.

Furthermore, the excrement-treating material 1' according to the present invention also enables discrimination between before use and after use, and in the case when the core part 1 is colored by a water-insoluble pigment or by a color of a base material of a material that is incorporated in a compounding material for the core part, the excrement-treating material has a constitution where the color of the core part 1 is seen through the surface layer 2 and the seeing-through is accelerated by the adhering part 8 upon absorption of excreted urine.

Alternatively, the core part 1 is colored by a water-soluble dye so that the excrement-treating material has a constitution where, upon absorption of excreted urine, the water-soluble dye is eluted into the excreted urine through the part 9 other than the adhering part 8 on the surface 1a of the core part to stain the surface layer 2.

Alternatively, a water-soluble dye powder is incorporated in the compounding material for the surface layer 2 so that the excrement-treating material has a constitution where the elution of the water-soluble dye powder into the water content of the highly-wet part 5 on the surface 1a of the core part is prevented by the adhering part 8, and also has a constitution where, upon absorption of excreted urine, the water-soluble dye powder is eluted into the excreted urine to stain the surface layer 2.

The invention claimed is:

1. An excrement-treating material comprising a water-absorbable core part and a water-absorbable surface layer covering the core part, wherein the material is constituted by:
    incorporating a pulverized water-absorbable polymer that has been pulverized into particle sizes of from 20 μm to 50 μm by means of a pulverizer and plant fibers each having a fiber length of 0.1 mm to 2 mm into a compounding material for the surface layer, and partially adding water to the surface of the core part after granulation to noncontinuously form a highly-wet part;
    reacting a water content in the highly-wet part and the pulverized water-absorbable polymer in the surface layer-compounding material to noncontinuously form an adhering part;
    bonding the surface layer to the surface of the core part through the adhering part; and
    upon absorption of excreted urine, accelerating the permeation of the excreted urine into the core part in a part other than the adhering part between the surface layer and the surface of the core part.

2. The excrement-treating material according to claim 1, wherein the core part is colored by a water-insoluble pigment or by a color of a base material of a material that is incorporated in a compounding material for the core part so that the excrement-treating material has a constitution where the color of the core part is seen through the surface layer and the seeing-through is accelerated by the adhering part upon absorption of excreted urine.

3. The excrement-treating material according to claim 1, wherein the core part is colored by a water-soluble dye so that the excrement-treating material has a constitution where, upon absorption of excreted urine, the water-soluble dye is eluted into the excreted urine through a part other than the adhering part on the surface of the core part to stain the surface layer.

4. The excrement-treating material according to claim 1, wherein a water-soluble dye powder is incorporated in the compounding material for the surface layer so that the excrement-treating material has a constitution where the elution of the water-soluble dye powder into the water content of the highly-wet part on the surface of the core part is prevented by the adhering part, and also has a constitution where, upon absorption of excreted urine, the water-soluble dye powder is eluted into the excreted urine to stain the surface layer.

5. A method for manufacturing an excrement-treating material comprising a water-absorbable core part and a water-absorbable surface layer covering the core part, the method comprising the processes of the following A to E:
    A: wet-kneading a compounding material for the core part;
    B: compression-granulating the wet-kneaded compounding material for the core part;
    C: partially adding water to the surface of the granulated core part;
    D: sprinkling a compounding material for the surface layer containing a pulverized water-absorbable polymer that has been pulverized into particle sizes of from 20 μm to 50 μm by means of a pulverizer and plant fibers each having a fiber length of 0.1 mm to 2 mm, with the surface of the core part to which water has been added; and
    E: compression-bonding the surface layer to the surface of the core part.

6. The method for manufacturing an excrement-treating material according to claim 5, wherein a water-insoluble pigment powder or a water-soluble dye powder or a water-soluble dye solution is incorporated in the compounding material for the core part.

7. The method for manufacturing an excrement-treating material according to claim 5, comprising a process of coloring the surface of the core part manufactured in the compression-granulating process with a water-insoluble pigment or a water-soluble dye.

8. The method for manufacturing an excrement-treating material according to claim 5, wherein a water-soluble dye powder is incorporated in the compounding material for the surface layer.

* * * * *